United States Patent
Messina et al.

(10) Patent No.: US 12,415,434 B2
(45) Date of Patent: Sep. 16, 2025

(54) CHARGING SYSTEM WITH SERVICE VEHICLE

(71) Applicant: Oshkosh Corporation, Oshkosh, WI (US)

(72) Inventors: Robert Messina, Oshkosh, WI (US); Shashank Bhatia, Oshkosh, WI (US); Ignacy Puszkiewicz, Hagerstown, MD (US); Mike Buhidar, Oshkosh, WI (US); David Lombardo, Oshkosh, WI (US); Peter Gilbert, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 69 days.

(21) Appl. No.: 18/158,238

(22) Filed: Jan. 23, 2023

(65) Prior Publication Data
US 2023/0234462 A1    Jul. 27, 2023

Related U.S. Application Data

(60) Provisional application No. 63/302,184, filed on Jan. 24, 2022.

(51) Int. Cl.
*B60L 53/36* (2019.01)
*B60L 53/12* (2019.01)
*B60L 53/38* (2019.01)

(52) U.S. Cl.
CPC .......... *B60L 53/36* (2019.02); *B60L 53/12* (2019.02); *B60L 53/38* (2019.02)

(58) Field of Classification Search
None
See application file for complete search history.

(56) References Cited

U.S. PATENT DOCUMENTS

| | | | | |
|---|---|---|---|---|
| 8,890,475 | B1 * | 11/2014 | Becker | B60L 53/66 320/109 |
| 9,731,614 | B1 * | 8/2017 | Sarwat | B60L 53/12 |
| 2007/0131505 | A1 * | 6/2007 | Kim | B60L 5/005 191/14 |
| 2012/0233062 | A1 * | 9/2012 | Cornish | B60L 53/35 700/275 |
| 2015/0033962 | A1 | 2/2015 | Schwartz et al. | |
| 2015/0159564 | A1 | 6/2015 | Wildgrube et al. | |
| 2015/0175353 | A1 | 6/2015 | Gillmore et al. | |
| 2016/0114687 | A1 * | 4/2016 | Ichikawa | B60L 53/38 307/104 |
| 2016/0129793 | A1 * | 5/2016 | Cronie | H02J 50/90 320/109 |

(Continued)

OTHER PUBLICATIONS

International Search Report and Written Opinion issued in connection with PCT/US2023/011319 dated Apr. 24, 2023, 12 pps.

*Primary Examiner* — David V Henze-Gongola
(74) *Attorney, Agent, or Firm* — FOLEY & LARDNER LLP

(57) ABSTRACT

A charging system includes a service vehicle and a controller. The service vehicle includes a chassis, a series of tractive elements coupled to the chassis, an energy storage device, and a charging interface operatively coupled to the energy storage device. The controller is configured to identify a location of a vehicle, control the service vehicle to navigate to the location of the vehicle, and control the service vehicle to transfer energy from the energy storage device to the vehicle through the charging interface.

7 Claims, 8 Drawing Sheets

(56) References Cited

U.S. PATENT DOCUMENTS

| | | |
|---|---|---|
| 2016/0303980 A1* | 10/2016 | Cyr .................. B60L 53/126 |
| 2017/0140603 A1 | 5/2017 | Ricci |
| 2017/0253221 A1 | 9/2017 | Verhoff et al. |
| 2017/0291802 A1 | 10/2017 | Hao et al. |
| 2017/0291805 A1 | 10/2017 | Hao et al. |
| 2017/0297425 A1 | 10/2017 | Wildgrube et al. |
| 2018/0086212 A1* | 3/2018 | Dudar .................. B60L 53/12 |
| 2018/0162704 A1 | 6/2018 | Hao et al. |
| 2019/0071291 A1 | 3/2019 | Puszkiewicz et al. |
| 2019/0119088 A1 | 4/2019 | Puszkiewicz et al. |
| 2019/0121353 A1 | 4/2019 | Datema et al. |
| 2019/0185077 A1 | 6/2019 | Smith et al. |
| 2019/0185301 A1 | 6/2019 | Hao et al. |
| 2019/0275892 A1* | 9/2019 | Williams .............. B60L 53/63 |
| 2019/0322321 A1 | 10/2019 | Schwartz et al. |
| 2019/0322512 A1 | 10/2019 | Puszkiewicz et al. |
| 2019/0351883 A1 | 11/2019 | Verhoff et al. |
| 2019/0352157 A1 | 11/2019 | Hao et al. |
| 2020/0031641 A1 | 1/2020 | Puszkiewicz et al. |
| 2020/0094671 A1 | 3/2020 | Wildgrube et al. |
| 2020/0140248 A1 | 5/2020 | Hackenberg et al. |
| 2020/0316816 A1 | 10/2020 | Messina et al. |
| 2020/0317065 A1 | 10/2020 | Lombardo |
| 2020/0317083 A1 | 10/2020 | Messina et al. |
| 2020/0317480 A1 | 10/2020 | Shankar et al. |
| 2020/0317486 A1 | 10/2020 | Puszkiewicz et al. |
| 2020/0317488 A1 | 10/2020 | Bafile et al. |
| 2020/0317489 A1 | 10/2020 | Bhatia et al. |
| 2020/0317491 A1 | 10/2020 | Bafile et al. |
| 2020/0317492 A1 | 10/2020 | Bhatia et al. |
| 2020/0317493 A1 | 10/2020 | Lombardo et al. |
| 2020/0346547 A1 | 11/2020 | Rocholl et al. |
| 2021/0002112 A1 | 1/2021 | Puszkiewicz et al. |
| 2021/0031611 A1 | 2/2021 | Yakes et al. |
| 2021/0031612 A1 | 2/2021 | Yakes et al. |
| 2021/0031649 A1 | 2/2021 | Messina et al. |
| 2021/0039935 A1 | 2/2021 | Hackenberg et al. |
| 2021/0124347 A1 | 4/2021 | Datema et al. |
| 2021/0155463 A1 | 5/2021 | Hao et al. |
| 2021/0221216 A1 | 7/2021 | Yakes et al. |
| 2021/0229755 A1 | 7/2021 | Schwartz et al. |
| 2021/0252969 A1 | 8/2021 | Wildgrube et al. |
| 2021/0276423 A1 | 9/2021 | Lombardo et al. |
| 2021/0276848 A1 | 9/2021 | Miller et al. |
| 2021/0276850 A1 | 9/2021 | Lombardo et al. |
| 2021/0279991 A1 | 9/2021 | Shankar et al. |
| 2021/0323763 A1 | 10/2021 | Koga et al. |
| 2021/0323764 A1 | 10/2021 | Koga et al. |
| 2021/0323765 A1 | 10/2021 | Koga et al. |
| 2021/0325529 A1 | 10/2021 | Koga et al. |
| 2021/0325911 A1 | 10/2021 | Koga et al. |
| 2021/0327164 A1 | 10/2021 | Koga et al. |
| 2021/0345062 A1 | 11/2021 | Koga et al. |
| 2021/0362696 A1 | 11/2021 | Verhoff et al. |
| 2021/0362697 A1 | 11/2021 | Verhoff et al. |
| 2021/0370893 A1 | 12/2021 | Verhoff et al. |
| 2021/0370894 A1 | 12/2021 | Verhoff et al. |
| 2021/0373560 A1 | 12/2021 | Koga et al. |
| 2021/0380085 A1 | 12/2021 | Verhoff et al. |
| 2021/0380179 A1 | 12/2021 | Smith et al. |
| 2021/0395058 A1 | 12/2021 | Hao et al. |
| 2022/0009338 A1 | 1/2022 | Yakes et al. |
| 2022/0033181 A1 | 2/2022 | Koga et al. |
| 2022/0097527 A1 | 3/2022 | Koga et al. |
| 2022/0097961 A1 | 3/2022 | Koga et al. |
| 2022/0097964 A1 | 3/2022 | Koga et al. |
| 2022/0135385 A1 | 5/2022 | Lombardo et al. |
| 2022/0144226 A1 | 5/2022 | Verhoff et al. |
| 2022/0144227 A1 | 5/2022 | Verhoff et al. |
| 2022/0176921 A1 | 6/2022 | Verhoff et al. |
| 2022/0185582 A1 | 6/2022 | Koga et al. |
| 2022/0185643 A1 | 6/2022 | Messina et al. |
| 2022/0194333 A1 | 6/2022 | Verhoff et al. |
| 2022/0194334 A1 | 6/2022 | Verhoff et al. |
| 2022/0234554 A1 | 7/2022 | Verhoff et al. |
| 2022/0234555 A1 | 7/2022 | Verhoff et al. |
| 2022/0234873 A1 | 7/2022 | Miller et al. |
| 2022/0289152 A1 | 9/2022 | Verhoff et al. |
| 2022/0332556 A1 | 10/2022 | Kobel et al. |
| 2022/0348090 A1 | 11/2022 | Lombardo |
| 2022/0371864 A1 | 11/2022 | Shankar et al. |
| 2023/0002152 A1 | 1/2023 | Koga et al. |
| 2023/0049763 A1 | 2/2023 | Messina et al. |
| 2023/0089417 A1 | 3/2023 | Koga et al. |
| 2023/0092520 A1 | 3/2023 | Verhoff et al. |

* cited by examiner

CHARGING SYSTEM WITH SERVICE VEHICLE

CROSS-REFERENCE TO RELATED PATENT APPLICATION

This application claims the benefit of and priority to U.S. Provisional Application No. 63/302,184, filed on Jan. 24, 2022, the entire disclosure of which is hereby incorporated by reference herein.

BACKGROUND

Aerial work platforms (AWPs) and mobile elevating work platforms (MEWPs) are increasingly transitioning to semi-electric or all electric configurations. To support the increasing electrification of these AWPs and MEWPs, the vehicles are equipped with one or more charge storing devices, such as batteries. Because the capacity of charge storing devices is limited, recharging is frequently needed.

SUMMARY

At least one embodiment relates to a charging system including a service vehicle and a controller. The service vehicle includes a chassis, a series of tractive elements coupled to the chassis, an energy storage device, and a charging interface operatively coupled to the energy storage device. The controller is configured to identify a location of a vehicle, control the service vehicle to navigate to the location of the vehicle, and control the service vehicle to transfer energy from the energy storage device to the vehicle through the charging interface.

Another embodiment relates to a service vehicle including a chassis, a series of tractive elements coupled to the chassis, a battery pack, a wireless charging interface configured to wirelessly transfer energy from the battery pack to a recipient vehicle, and a boom assembly coupling the wireless charging interface to the chassis and configured to move the wireless charging interface relative to the chassis.

Another embodiment relates to a non-transitory computer-readable medium having instructions stored thereon that, when executed by one or more processors, cause the one or more processors to implement operations. The operations include receiving location data indicating a location of a vehicle to be charged, controlling a service vehicle to autonomously navigate to the location, controlling an actuator assembly of the service vehicle to adjust a position of a wireless charging interface of the service vehicle relative to a chassis of the service vehicle, and controlling the wireless charging interface to transfer energy from a battery pack of the service vehicle to the vehicle to be charged.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the figures generally, the various exemplary embodiments disclosed herein relate to systems, apparatuses, and methods for charging a lift device, such as an AWP or MEWP. The system for charging a lift generally includes an autonomous service vehicle. The service vehicle includes a chassis, a series of tractive elements coupled to the chassis, an electrical cabinet coupled to the chassis, a battery assembly coupled to the chassis, a boom assembly coupling a charging implement to the chassis, and a controller. The boom assembly includes one or more telescoping sections and one or more actuators configured to move each individual section relative to one another, providing control over the extension of the boom assembly.

The charging implement includes an induction coil (e.g., a copper coil, etc.) that is configured to receive current from an electrical power source, such as a utility source (e.g., from a wall socket, etc.), generator, or battery assembly. When the induction coil is powered, current is supplied from the electrical power source to the induction coil, which creates a magnetic field. The magnetic field extends upwardly and outwardly from the charging implement, such that a lift or other equipment positioned proximate to the charging implement can interact with the generated magnetic field. If the lift or other equipment includes an antenna loop (e.g., a copper coil) in communication with its battery or battery assembly, a current will be generated within the antenna loop when the antenna loop is positioned within the magnetic field generated by the induction coil. The current within the antenna loop can then be supplied to the battery or battery assembly within the lift or other equipment to charge the battery or battery assembly without the need for a wired connection. After a sufficient charge level is achieved, the lift or other equipment can drive away from or otherwise be removed from the charging implement.

Figure 1:
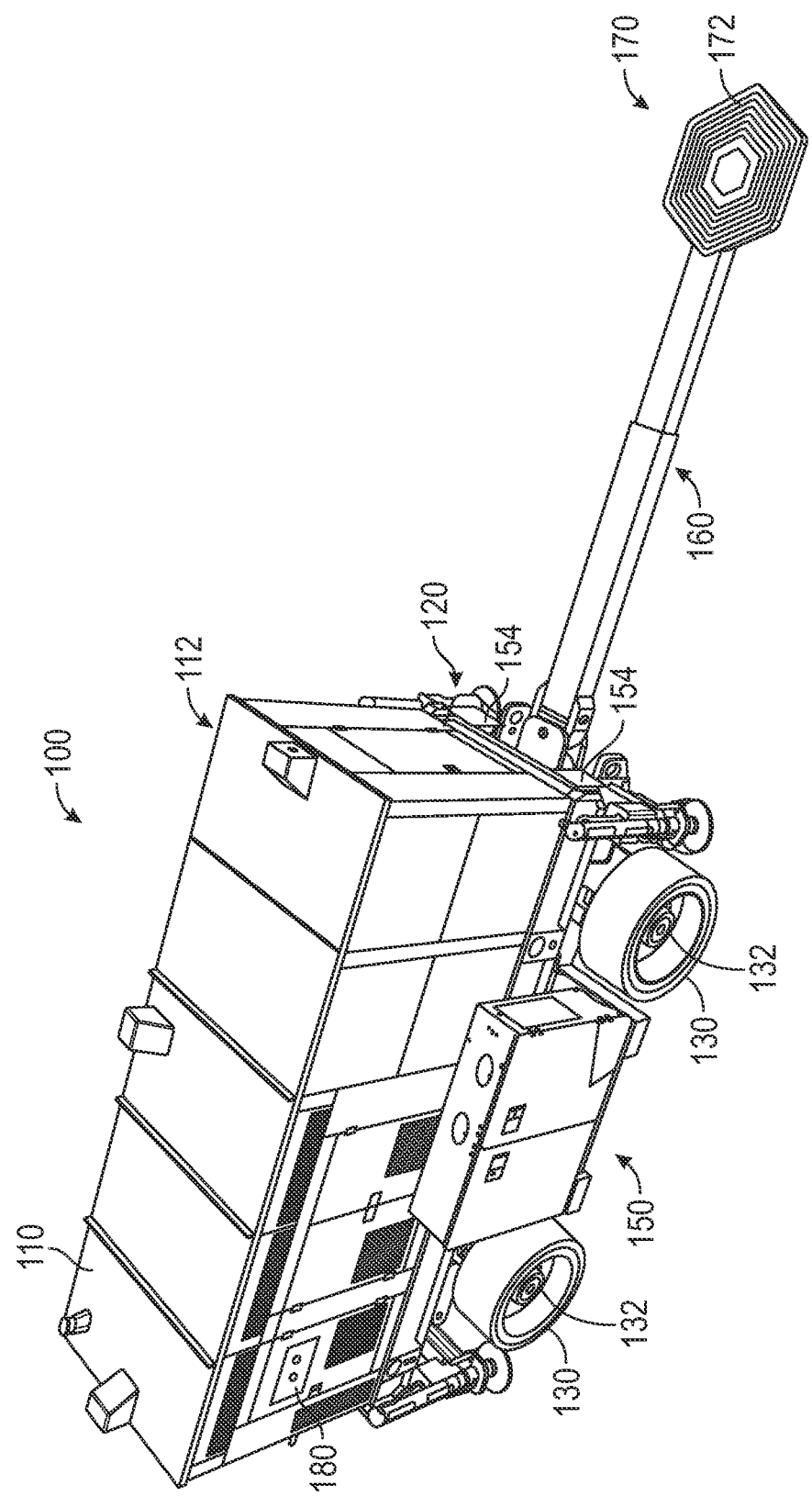
FIG. 1 is a perspective view of a service vehicle, according to one embodiment.

Referring now to FIG. 1, a service vehicle 100 is depicted. The service vehicle 100 generally includes a frame, shown as chassis 120, a series of tractive elements 130 (e.g., wheel and tire assemblies, crawler tracks, etc.) coupled to the chassis 120, an electrical cabinet 110 coupled to the chassis 120, a battery assembly 112 (e.g., a battery pack, a battery module, etc.) coupled to the chassis 120, a boom assembly 160 coupling a charging implement 170 to the chassis 120, and a controller 150 coupled to the chassis 120. The charging implement 170 includes a charging pad 172.

The tractive elements 130 engage a support surface to support the service vehicle 100. In some embodiments, one or more of the tractive elements 130 are driven to propel the service vehicle 100. As shown, the service vehicle 100 includes a series of actuators or drivers, shown as electric motors 132, that drive the tractive elements 130. The electric motors 132 may be powered using electrical energy from the battery assembly 112. The electric motors 132 may be coupled to a controller, such as the controller 150 depicted in FIG. 1, providing the controller 150 with control over navigation (e.g., steering and propulsion) of the service vehicle 100.

In some embodiments, the electrical cabinet 110 can support a variety of different electrical components, including transformers that are configured to step down and/or step up voltage received from a secondary source. In some examples, the electrical cabinet 110 also receives one or more inverters. The inverters are configured to transition direct current electricity stored within one or more batteries included in the battery assembly 112 into alternating current electricity for use by the charging pad 172, as discussed below. The electrical cabinet 110 may be coupled to the controller 150 to communicate data regarding the battery life of the battery assembly 112.

In some embodiments, the electrical cabinet 110 stores or is coupled to an electrical power source. For example, in some embodiments, the electrical cabinet is placed in communication with a utility source. The utility source can supply standard utility alternating current electrical power at 120 V and 60 Hz, for example. In other embodiments, the electrical cabinet 110 is placed in communication with a 240 V or 480 V power source instead. Additionally or alternatively, the electrical cabinet 110 can support one or more batteries included in the battery assembly 112. In some examples, a plurality of rechargeable batteries are included in the battery assembly 112 (e.g., lithium-ion, nickel-cadmium, lead-acid, etc.) and are received within the electrical cabinet 110. The battery assembly 112 is configured to receive electricity from the utility source through the inverter, which converts the AC utility source power into DC power which can be stored within the battery. In some examples, the battery assembly 112 can also be charged from other equipment engaged with the charging pad 172. In some embodiments, the electrical cabinet 110 houses an internal combustion engine and a generator that are configured to produce and supply power as a secondary power source. In some embodiments, the electrical cabinet 110 is in communication with one or more solar panels that supply electrical energy in response to exposure to light.

In some embodiments, the electrical cabinet 110 is electrically coupled to the charging pad 172 and is configured to supply electrical current to the charging pad 172. Electrical current is provided from the electrical cabinet 110 to the charging pad 172 by one or more of the power sources in communication with the electrical cabinet 110. In some examples, a wired connection of one or more cables and/or a plug is formed between the electrical cabinet 110 and the charging pad 172 so that electrical current can be efficiently transmitted between the electrical cabinet 110 and the charging pad 172. The electrical power transmitted from the electrical cabinet 110 can be preconditioned depending on the electrical supply source. For example, electrical power supplied to the charging pad 172 by the utility source can be passed through a transformer before being supplied to the charging pad 172. Alternatively, electrical power provided from the battery assembly 112 can be passed to an inverter before being supplied to the charging pad 172, such that alternating current is always provided to the charging pad 172.

Figure 2:
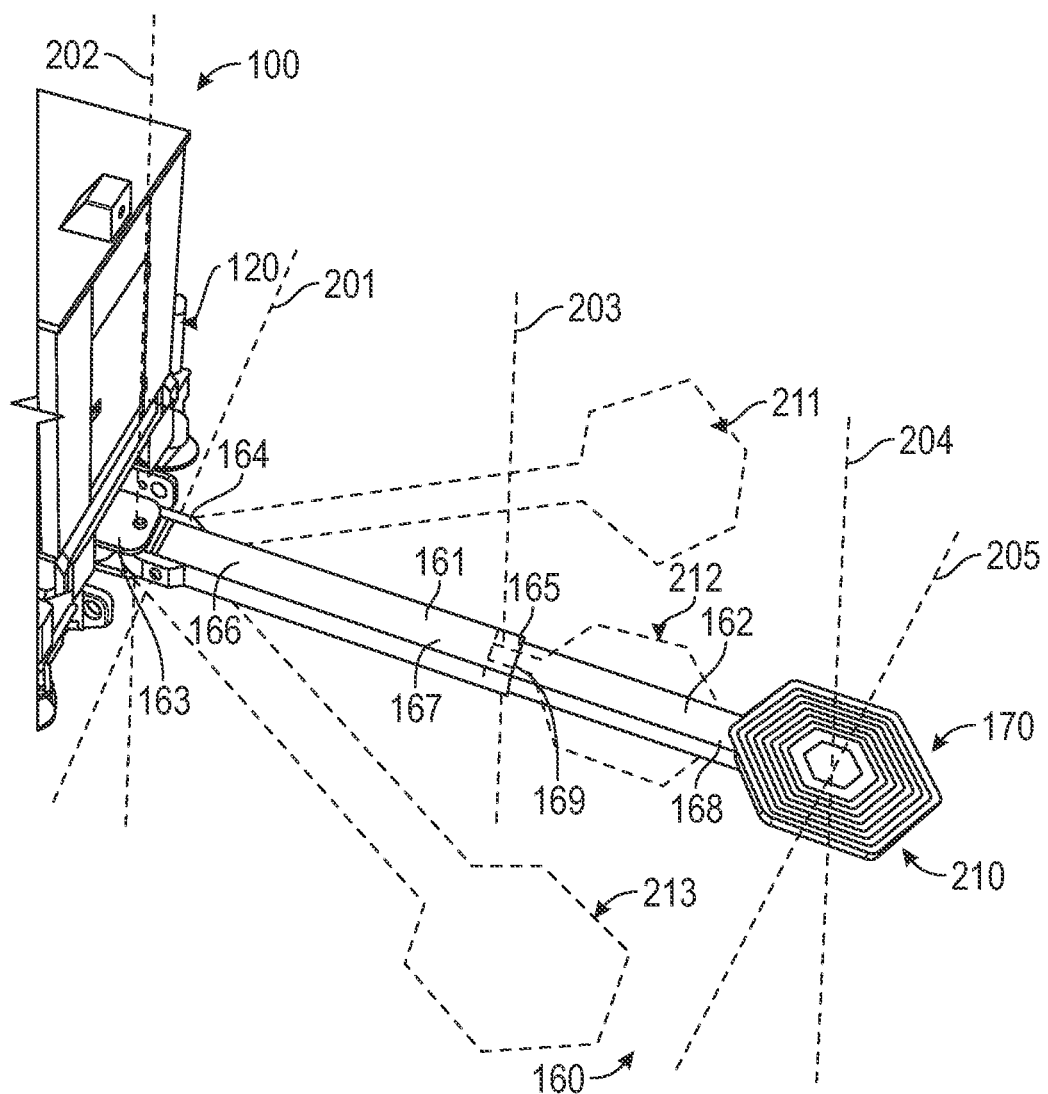
FIG. 2 is a perspective view of the boom assembly of FIG. 1, according to one embodiment.

Referring now to FIG. 2, the boom assembly 160 (e.g., an actuator assembly) of the service vehicle 100 depicted in FIG. 1 is shown, according to some embodiments. The boom assembly 160 includes a boom base 161 (e.g., a base boom section), a telescope section 162 (e.g., a fly boom section), a first vertical joint 163, a second vertical joint 165, and a horizontal joint 164. A proximal end 166 of the boom base 161 is pivotably coupled to the chassis 120 by the first vertical joint 163 and the horizontal joint 164, facilitating rotation of the boom base 161 relative to the chassis 120 about a first horizontal axis 201 and a first vertical axis 202, respectively. The telescope section 162 is received within the boom base 161 (e.g., the boom base 161 is a hollow, tubular member) and is displaceable (e.g., selectively repositionable) between a retracted position and an extended position. The telescope section 162 is received within a distal end 167 of boom base 161 and is configured to extend and retract, moving the charging implement toward or away from the chassis 120. The rotation of the boom base 161 about the first vertical axis 202 and the displacement of the telescope section 162 between extended and retracted positions permits lateral and longitudinal movement of the charging implement 170 to reach various positions, including but not limited to positions 210, 211, 212, and 213 of FIG. 2. The distal end 167 of the boom base 161 includes a second vertical joint 165. When the telescope section 162 is in a fully extended position (e.g., position 210), a proximal end 169 of the telescope section 162 engages the second vertical joint 165 and may rotate about a second vertical axis 203 relative to the boom base 161. The articulation of the boom assembly 160 about the second vertical axis 203 may facilitate navigating the charging implement 170 around obstacles (e.g., around the wheels of another vehicle to be charged).

Figure 7:
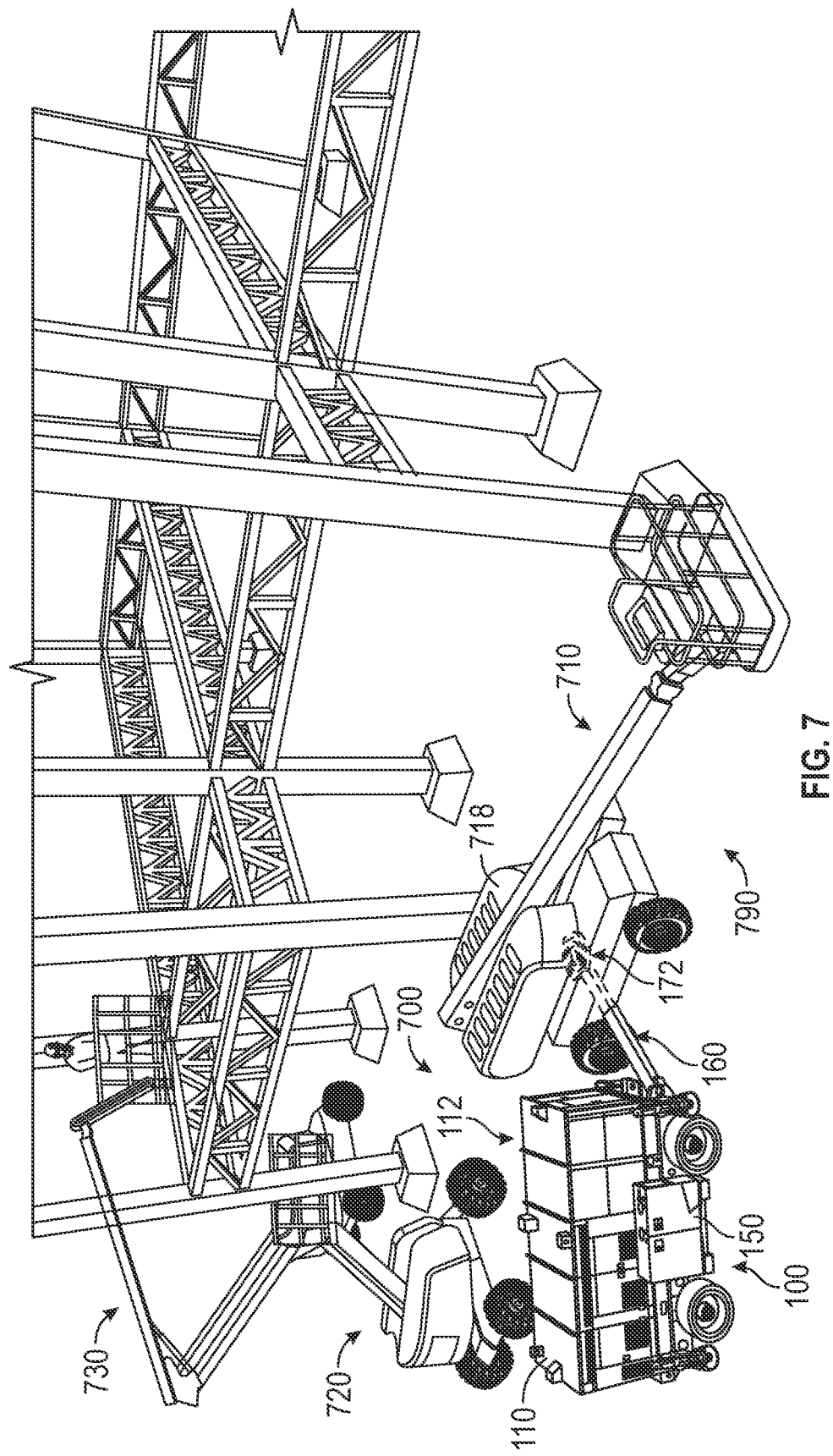
FIG. 7 is a perspective view of the service vehicle of FIG. 1, shown interacting with a lift on a job site, according to one embodiment.

In some embodiments, the charging implement 170 is coupled to the service vehicle 100 by an articulating boom lift (e.g., an articulating boom lift of the lift device 730 shown in FIG. 7), instead of the boom assembly 160 as described above, and the charging implement 170 is coupled to an implement on the end of the articulating boom lift. The articulating boom lift may control the position of the charging implement 170 by manipulating one or more telescopic sections, the one or more telescopic sections coupled to one another by a series of joints, and controlling the positions of the one or more telescopic sections relative to one another with a series of hydraulic assemblies. In this way, the service vehicle 100 may raise and lower the charging implement 170 differently than, or in addition to, as described above in relation to the boom assembly 160.

In some embodiments, the charging implement 170 is fixedly coupled to a distal end 168 of the telescope section 162. In other embodiments, the charging implement 170 is rotatably coupled to the distal end 168 of the telescope section 162 by a turntable, allowing the charging implement 170 to rotate relative to the telescope section 162 about a third vertical axis 204. In other embodiments still, the charging implement 170 may be coupled to the distal end 168 of the telescope section 162 by a second vertical joint, facilitating rotation of the charging implement 170 relative to the telescope section 162 about a second horizontal axis 205.

Movement of the boom assembly 160 may be controlled by one or more actuators. In some embodiments, the actuators are electric actuators (e.g., electric linear actuators) powered by electrical energy from the battery assembly 112. The boom assembly 160 may include one or more first actuators configured to translationally move the telescope section 162 relative to the boom base 161. The boom assembly may include one or more second actuators coupled to the first vertical joint 163 and one or more third actuators coupled to the horizontal joint 164. The second actuators and the third actuators may be configured to control rotation of the boom base 161 relative to the chassis 120 about the first horizontal axis 201 and the first vertical axis 202, respectively. The boom assembly 160 may further include one or more fourth actuators coupled to the turntable that couples the charging implement 170 to the distal end 168 of the telescope section 162. The fourth actuators may be configured to control rotation of the charging implement 170 relative to the telescope section 162 about the second vertical axis 204. The boom assembly 160 may further include one or more fifth actuators coupled to the vertical joint that couples the charging implement 170 to the telescope section 162. The fifth actuators may be configured to control rotation of the charging implement 170 relative to the telescope section 162 about the second horizontal axis 205. The first, second, third, fourth, and/or fifth actuators of the boom assembly 160 may be coupled to a controller, such as the controller 150 depicted in FIG. 1, providing the controller 150 with control over the position of the charging implement 170.

Figure 3:
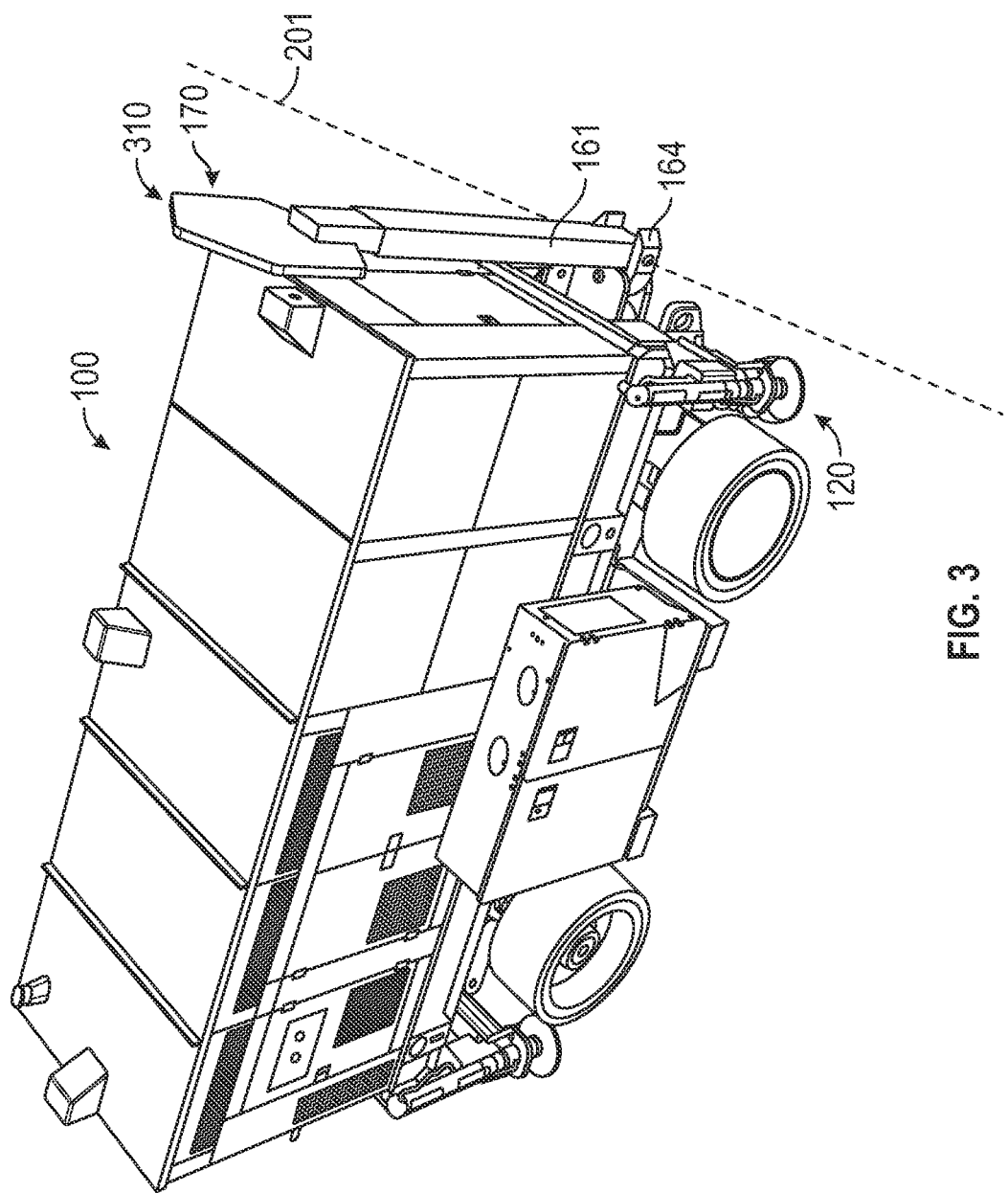
FIG. 3 is a perspective view of the service vehicle of FIG. 1, showing the boom assembly in a vertical position, according to one embodiment.

Referring now to FIG. 3, a perspective view of the service vehicle 100 depicted in FIG. 1 is shown, according to one embodiment. As described in relation to FIG. 2, the boom base 161 may rotate relative to the chassis 120 about the first horizontal axis 201, moving the charging implement 170 to reach various positions including, but not limited to, position 310. In the position 310, the boom base 161 is oriented substantially vertically, adjacent the electrical cabinet 110. This reduces the footprint of the service vehicle 100 relative to an active position (e.g., the positions 210, 211, 212, and 213 of FIG. 2) that places the charging implement 170 farther from the electrical cabinet 110 and the chassis 120. The position 310 may act as a storage position or transport position, facilitating unobstructed movement of the service vehicle 100. In the active position, the charging implement 170 may face upward (e.g., as shown in FIG. 2) to interact with an antenna coil 712 along a bottom surface of a lift device 700. Alternatively, the charging implement 170 may rotate about the horizontal axis 205 to face longitudinally outward, away from the chassis 120, to interact with an antenna coil 712 along a front, rear, left, or right side of a lift device 700. Alternatively, the charging implement 170 may rotate about the horizontal axis 205 to face downward to interact with an antenna coil 712 along a top side of a lift device 700.

Figure 4:
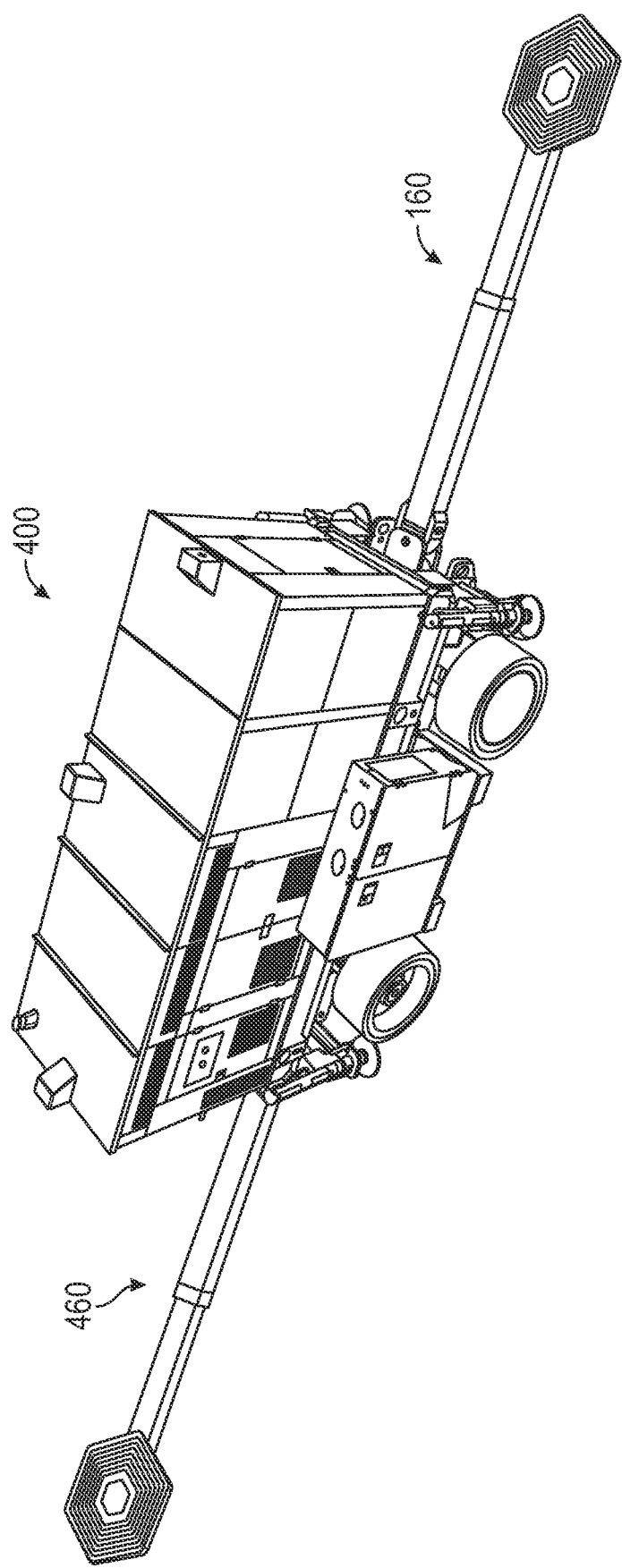
FIG. 4 is a perspective view of a service vehicle with a secondary boom assembly, according to one embodiment.

Referring now to FIG. 4, a perspective view of a service vehicle 400 is shown, according to one embodiment. The service vehicle 400 may be substantially similar to the service vehicle 100, except the service vehicle 100 further includes a secondary boom assembly 460. Accordingly, any description with respect to the service vehicle 100 may also apply to the service vehicle 400. The secondary boom assembly 460 may be substantially similar to the boom assembly 160. Accordingly, the secondary boom assembly 460 may operate similarly to the boom assembly 160. In other embodiments, the secondary boom assembly 460 may be configured to operate differently than the boom assembly 160. By including two boom assemblies, the service vehicle 400 may charge two or more external vehicles simultaneously.

Figure 5:
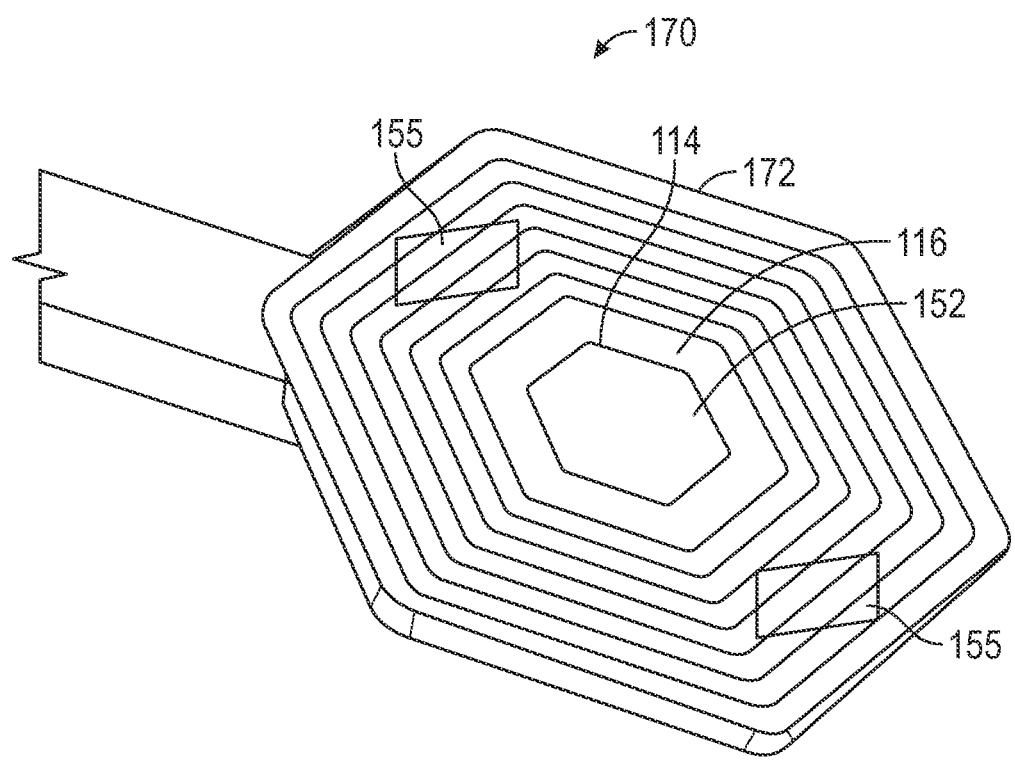
FIG. 5 is a perspective view of the charging pad of the service vehicle depicted in FIG. 1, according to one embodiment.

Referring now to FIG. 5, a perspective view of the charging implement 170 of the service vehicle 100 depicted in FIG. 1 is shown, according to one embodiment. Electrical current received by the charging pad 172 is routed to an induction coil 114 positioned within the charging pad 172. The induction coil 114 includes a wire structure formed of a conductive material (e.g., copper) having one or more turns or coils. When an electrical current is provided to the induction coil 114, the current travels through the wire structure in a circular manner. Movement of the current through the induction coil 114 creates a magnetic field that extends vertically upward, through the upper surface 152 of the charging pad 172 and above the charging pad 172, generally. The magnetic field generated by the induction coil 114 can then be used to generate and wirelessly charge lifts and other equipment positioned within the magnetic field, as explained in additional detail below.

In some embodiments, the induction coil 114 is positioned within a charging area 116 formed within the charging pad 172. The charging area 116 may represent a range of locations within which the magnetic field is strongest, and thus charging is most effective. As depicted in FIG. 1, the charging area 116 can be visually marked on the charging pad 172 (e.g., with different coloration, with a series of concentric rings, etc.) so that an operator of a lift device or other vehicle can easily identify the location in which the induction coil 114 is positioned. In some examples, the charging area 116 is centrally located within the charging pad 172. In other examples, the charging area 116 is offset to one side of the charging pad 172.

Figure 6:
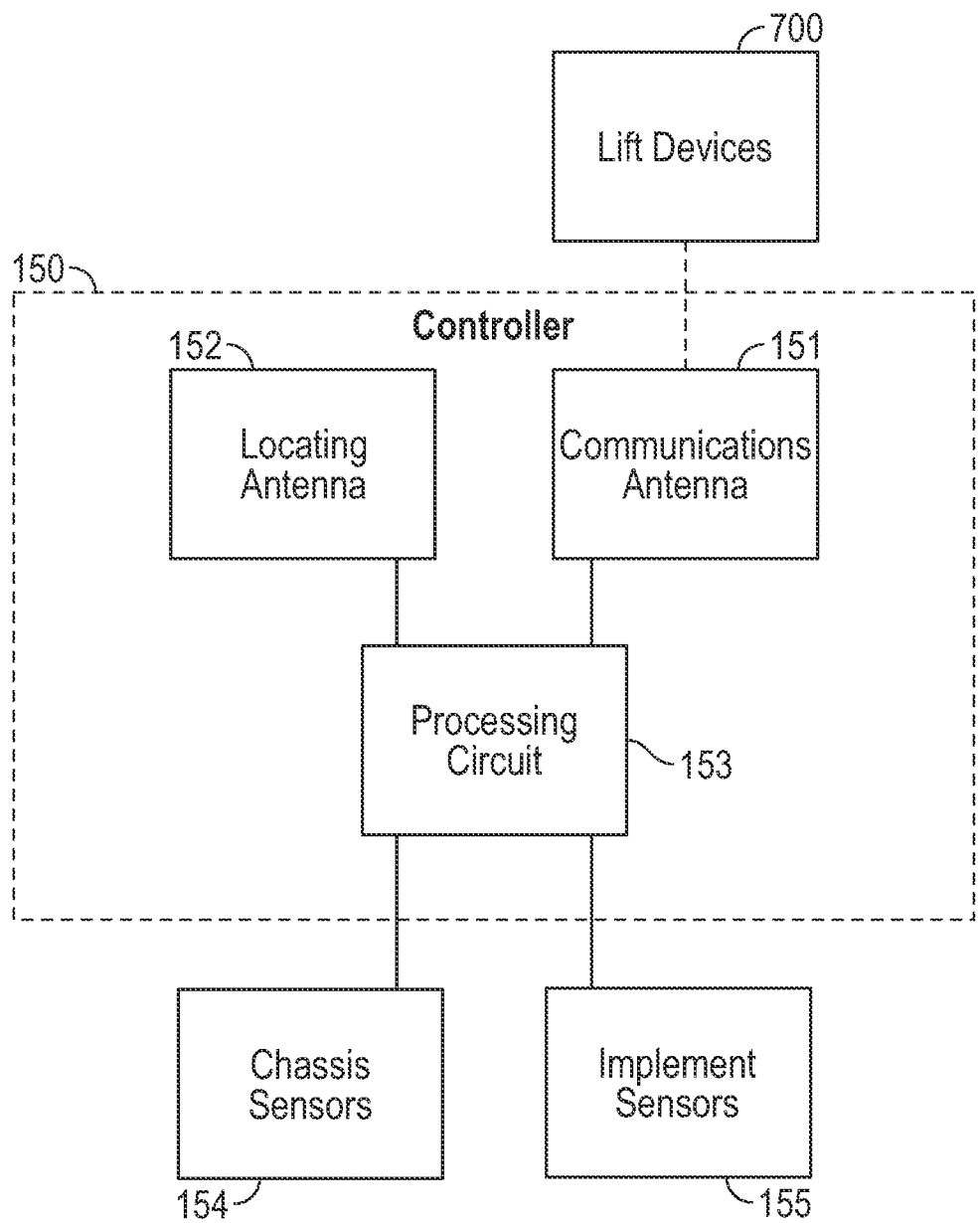
FIG. 6 is a block diagram showing the controller of the service vehicle depicted in FIG. 1, according to one embodiment.

Referring now to FIG. 6, a block diagram of the controller 150 of the service vehicle depicted in FIG. 1 is shown, according to one embodiment. The controller 150 includes a processing circuit 153 operatively coupled to a communications antenna 151 and a locating antenna 159. The processing circuit 153 may include a processor and a memory. The memory may contain one or more instructions that, when executed by the processor, cause the processing circuit 153 to perform one or more of the functions described herein. The processing circuit 153 may be further operatively coupled to one or more chassis sensors, such as chassis sensors 154 depicted in FIG. 1. The processing circuit 153 may be further coupled to one or more implement sensors, such as implement sensors 155 depicted in FIG. 5.

In some embodiments, the controller 150 is positioned onboard the service vehicle 100. In some embodiments, the controller 150 is a cloud-based controller positioned remotely from the service vehicle 100. In some embodiments, the controller 150 includes multiple controllers cooperating to provide the functionality of the controller 150 described herein. By way of example, the controller 150 may represent a first controller positioned onboard the service vehicle 100 and a second cloud-based controller in communication with one another.

In some embodiments, the communications antenna 151 may be configured to communicate with one or more other devices. The communications antenna 151 may be configured to receive location data from one or more external vehicles, such as one or more lift devices 700 depicted in FIG. 7. The communications antenna 151 may be configured to receive data regarding the battery life status (e.g., a charge level) of the one or more lift devices 700. The communications antenna 151 may be configured to receive location data from one or more charging systems for charging the service vehicle 100. In some embodiments, the communications antenna 151 is configured to communicate using a wireless communication protocol, including but not limited to, Wi-Fi (e.g. 802.11x), Wi-Max, cellular (e.g. 3G, 4G, LTE, CDMA, etc.), LoRa, Zigbee, Zigbee Pro, Bluetooth, Bluetooth Low Energy (BLE), Near Field Communication (NFC), Z-Wave, 6LoWPAN, Thread, RFID, and other applicable wireless protocols. In some embodiments, the communications antenna 151 may communicate with a network (e.g. via Wi-Fi) of a job site, such as a job site 790 depicted in FIG. 7. In some embodiments, the communications antenna 151 may communicate with a network of the job site 790 to access a central server, such as a cloud based server, as will be described in more detail. In other embodiments, the communications antenna 151 may communicate with a local communications hub or bridge, such as a communications hub associated with one or more lift devices. In still other embodiments, the communications antenna 151 may be configured to allow for the service vehicle 100 to communicate directly with a central or cloud-based server (e.g. via a cellular connection). In some embodiments, the communications antenna 151 may be used to communicate with a user device capable of remotely controlling the service vehicle 100. Example user devices capable of remotely controlling the service vehicle 100 may include dedicated remote controls, smart phones, tablet computers, laptop computers, or any other user device capable of interfacing with the controller 150.

In some embodiments, the locating antenna 159 (e.g., a location sensor) may be configured to provide location data to the controller 150 of the service vehicle 100. In some embodiments, the locating antenna 159 may be a Global Positioning Satellite (GPS) antenna for receiving locations data from a number of GPS satellites. In other embodiments, the locating antenna 159 may be configured to receive one or more differential GPS signals for determining a location of the service vehicle 100. In still other embodiments, the locating antenna 159 may be configured to receive one or more inputs from a local positioning system. For example, the locating antenna 159 may be configured to receive data from an installed boundary system (such as a buried cable, or placed transmitters). Additional local positioning data may come from an aerial transmitter, such as on a rooftop or a drone. Further local positioning data may include optical boundary data, magnetic boundary data, etc. In still further embodiments, the locating antenna 159 may relay data to other service vehicles, or supervisory controllers to allow for a position of the service vehicle 100 to be monitored. However, in some embodiments, the location data of the service vehicle 100 may be communicated via the communications antenna 151.

In some embodiments, the implement sensors 155 may be positioned around the surface of the charging implement 170 as depicted in FIG. 1, as well as in other locations as needed for a given configuration. The implement sensors 155 may provide implement position data indicating a position of the charging implement 170 relative to a portion of another vehicle or charging implement (e.g., the antenna coil 712 of the lift device 710, an antenna coil that provides electrical energy to recharge the service vehicle 100, etc.). The implement sensors 155 may be all of the same type, or may be a combination of different sensor types. The implement sensors 155 may include object detection sensors, such as infrared (IR), LIDAR, RADAR, Time-of-Flight (ToF), CCD, CMOS, Ultrasonic, Sonar, or other sensors configured to detect objects. The implement sensors 155 may be used to detect a charging pad underneath a lift device. The implement sensors 155 may be used to detect a charging pad to charge the service vehicle. The implement sensors 155 may provide data to the controller 150, which can process the data to perform functions as will be described in more detail below.

In some embodiments, the chassis sensors 154 on the service vehicle 100 may be positioned around the service vehicle 100 as depicted in FIG. 1, as well as in other locations as needed for a given configuration. The chassis sensors 154 may be all of the same type, or may be combination of different sensor types. The chassis sensors 154 may include object detection sensors, such as infrared (IR), LIDAR, RADAR, Time-of-Flight (ToF), CCD, CMOS, Ultrasonic, Sonar, or other sensors configured to detect objects. The chassis sensors 154 may be used to detect objects, to map the job site 790, or to assist in guidance of the service vehicle 100. Further sensors may include moisture sensors, rain sensors, air quality sensors, magnetic field sensors (e.g. compass), temperature sensors, digital imaging sensors, motion detection sensors, rotation sensors, gyroscopes, chemical detection sensors, and the like. In some embodiments, the chassis sensors 154 are coupled to the controller 150, and are used to provide data to the controller 150, which can process the data to perform functions as will be described in more detail below.

Referring now to FIG. 7, a process for wirelessly charging one or more lift devices 700 using a service vehicle, such as the service vehicle 100 depicted in FIG. 1, is shown according to one embodiment. The one or more lift devices 700 may include a lift device 710, a second lift device 720, and a third lift device 730. Although shown as telescopic boom lift, the one or more lift devices 700 can each be a variety of different lift devices, including a scissor lift, telehandler, electric scissor lift, forklift, or other suitable devices that include one or more battery-operated or electrical components.

In some embodiments, a controller, such as the controller 150 depicted in FIG. 1 and described in further detail regarding FIG. 6, may be configured to use data received from the communications antenna 151 and/or the locating antenna 159, to determine the location of each of the one or more lift devices 700, the state of the battery life of each of the one or more lift devices 700, and define an order of priority of charging stops via the processing circuit 153. The processing circuit 153 may compile the data and provide the controller 150 with commands to communicate to the service vehicle 100 for autonomously driving into proximity with one of the one or more lift devices 700 to begin the process for wirelessly charging one of the one or more lift devices 700. The controller 150 may receive data regarding the surrounding environment of the service vehicle 100 from the chassis sensors 154. The processing circuit 153 may compile the data and provide additional commands to the service vehicle 100 to adjust course to one of the one or more lift devices 700 based on the data regarding the surrounding environment. For example, the chassis sensors 154 may communicate data regarding various obstructions on the job site 790 to avoid on route to one of the one or more lift devices 700. The controller 150 may receive data regarding the surrounding environment of the charging implement 170 from the implement sensors 155. The processing circuit 153 may compile that data and provide commands to the boom assembly 160 to articulate the position of the charging implement 170 to reach a charging area of one of the one or more lift devices 700, as described in further detail below. As shown, the service vehicle 100 may interact with a lift device 710 to charge a battery, such as a battery 714 depicted in FIG. 8, of the lift device 710. In some embodiments, the service vehicle may be commanded by the controller 150 to drive into proximity of two of the one or more lift devices 700 and charge both of the lift devices simultaneously with the boom assembly 160 and a secondary boom assembly, such as the secondary boom assembly 460 depicted in FIG. 4.

Figure 8:
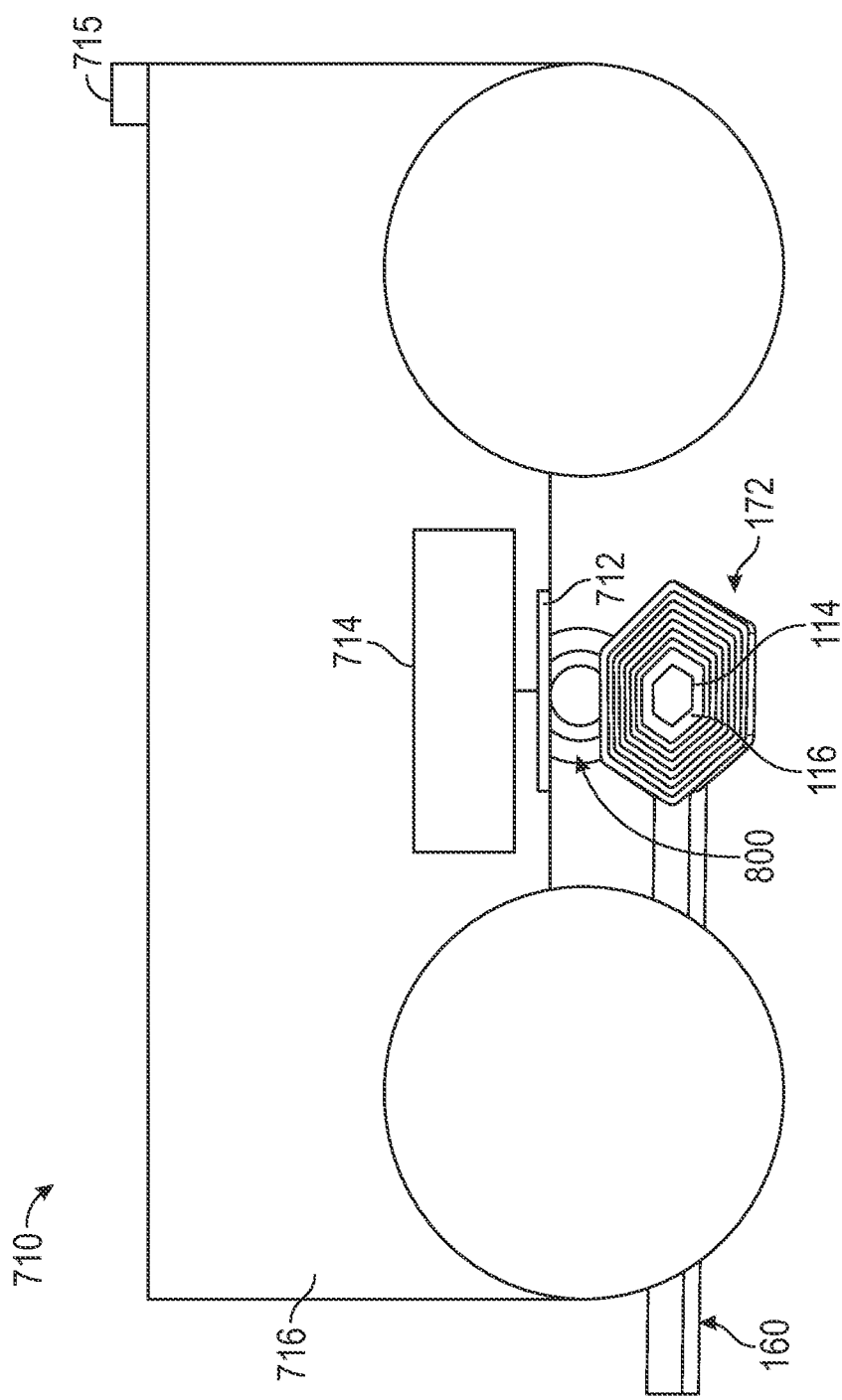
FIG. 8 is a schematic view of the lift device of FIG. 7 positioned in proximity with the charging pad of FIG. 1, according to one embodiment.

Referring now to FIG. 8, a process for wirelessly charging a lift device, such as the lift device 710 depicted in FIG. 7, is shown according to one embodiment. The wireless charging process generally includes a service vehicle, such as the service vehicle 100 depicted in FIG. 1, interacting with the lift device 710 as depicted in FIG. 7, to discharge an electric charge through the charging pad 172 of the service vehicle 100. To interact with the service vehicle 100, the lift device 710 includes an antenna coil 712 that is electrically coupled with the battery 714 of the lift device 710. The antenna coil 712, like the induction coil 114 depicted in FIG. 5, may be formed of copper wire that includes a series of turns. When the antenna coil 712 is positioned within a magnetic field, a current in generated within the antenna coil 712 that can then be provided to the battery 714 to help charge the battery 714. Accordingly, to better position the antenna coil 712 within magnetic fields (e.g., such as the magnetic field created by the induction coil 114), the antenna coil 712 is positioned at or near a base of a chassis 716 of the lift device 710. Accordingly, the antenna coil 712 will be positioned at or near an absolute bottom of the chassis 716 of the lift device 710.

In some embodiments, a service vehicle, such as the service vehicle 100 depicted in FIG. 1, drives into proximity with the lift device 710. As shown, the service vehicle 100 may then extend and/or pivot a boom assembly, such as the boom assembly 160 depicted in FIG. 1, until the antenna coil 712 is positioned directly or approximately directly above the induction coil 114 of a charging pad, such as the charging pad 172 depicted in FIG. 1, and the charging area 116 of the charging pad 172, more generally. Although shown centered above the charging area 116 and the induction coil 114, certain versions of the lift device 710 may have an antenna coil 712 offset to a different side of the lift device 710. For example, in some embodiments, the antenna coil 712 is offset to one of the corners of the chassis 716. Such a configuration may help facilitate the autonomous positioning of the service vehicle 100 and the autonomous positioning of the charging pad 172 when the job site 790 is crowded or where debris or other obstructions exist on the ground between the service vehicle 100 and the lift device 710, given the limited reach of the boom assembly 160. In other examples, the lift device 710 includes an indicator 715 (e.g., a light) on the chassis 716 or a lift device housing, such as a lift device housing 718 depicted in FIG. 7, that illuminates when the antenna coil 712 is positioned within the charging area 116 and the battery 714 is receiving power (i.e., the battery is charging).

In some embodiments, with the lift device 710 positioned so that the antenna coil 712 is above the induction coil 114 and the charging area 116, the antenna coil 712 is positioned within a magnetic field 800 created by the current passing through the induction coil 114. The antenna coil 712 within the magnetic field 800 generates a current within the antenna coil 712, which is then passed upwardly, to the battery 714 of the lift device 710 to charge the battery 714. In some examples, the indicator 715 can provide a visual indication that charging is complete, or that charging has reached a threshold level.

Although depicted as an induction coil 114, various other types of wireless charging mechanisms can be used. For example, magnetic resonance charging, electric field coupling, or radio receptioning can be used in lieu of magnetic induction. While operationally different, the structure for each different type of wireless charging mechanism described above can be considered encompassed within the term "induction coil."

Referring again to FIG. 7, when a desired charge level has been reached, the controller of the service vehicle 100 can drive the service vehicle 100 and/or otherwise move the boom assembly 160 and charging pad 172 of the service vehicle 100, away from the lift device 710. The service vehicle 100 may then move to the next one of the one or more lift devices 700 on the order of priority, such as the lift device 720 or the lift device 730, to complete a similar charging process.

In some embodiments, the service vehicle 100 may be further configured to autonomously recharge itself. The controller 150 may be configured to use data received from the electrical cabinet 110 of the service vehicle 100 to determine when the battery life (e.g., charge level, state of charge, etc.) of the battery assembly 112 of the service vehicle 100 is low (e.g., below a predetermined threshold state of charge). The controller 150 may use data received from the communications antenna 151 and/or the locating antenna 159 to determine where the service vehicle must go to engage a charging system and recharge the battery assembly 112. In some embodiments, the charging pad 172 may be further configured to receive an electrical charge. The inverters received in the electrical cabinet 110 may transition alternating current electricity received by the charging pad 172 into direct current electricity for storage in one or more of the batteries in the battery assembly 112. In some embodiments, one or more of the batteries in the battery assembly 112 may be exchanged with new batteries that may be delivered to the job site 790 from a remote charging station. In some embodiments, one or more of the batteries in the battery assembly 112 may be charged by receiving an electricity through a charging port 180 depicted in FIG. 1, the charging port 180 coupled to the electrical cabinet 110.

Using the above described service vehicles and methods, a jobsite can incorporate a wireless charging unit that can help to continuously charge lift devices and other equipment, according to one embodiment. The autonomous service vehicle can create a faster and more efficient way to charge devices remotely, which helps to ensure that devices at a jobsite are operable beyond the life of a single charge of a battery. While conventional equipment is typically only able to operate for as long as a single charge of a battery lasts, the service vehicle disclosed herein permits for extended use of equipment.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the service vehicle 100 as shown in the various exemplary embodiments is illustrative only. Additionally, any element disclosed in one embodiment may be incorporated or utilized with any other embodiment disclosed herein. For example, the boom assembly 460 of the exemplary embodiment shown in at least FIG. 4 may be incorporated in the service vehicle 100 of the exemplary embodiment shown in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:
1. A service vehicle, comprising:
   a chassis;
   a plurality of tractive elements coupled to the chassis;
   a cabinet containing a battery pack and extending above the chassis;

a wireless charging interface configured to wirelessly transfer energy from the battery pack to a recipient vehicle; and a boom assembly coupling the wireless charging interface to the chassis and configured to move the wireless charging interface relative to the chassis, wherein the wireless charging interface is repositionable between a storage position and an active position, wherein the wireless charging interface is located farther from the chassis in the active position than in the storage position, wherein the boom assembly extends away from the chassis in a first direction when the wireless charging interface is in the active position, wherein the boom assembly extends above the chassis and along a side of the cabinet when the wireless charging interface is in the storage position, wherein the wireless charging interface faces upward and away from the chassis when in the active position, and wherein the wireless charging interface faces in a second direction opposite the first direction when in the storage position.

2. The service vehicle of claim 1, wherein the boom assembly includes a base boom section coupled to the chassis and a fly boom section coupled to the wireless charging interface, and wherein the fly boom section is slidably coupled to the base boom section.

3. The service vehicle of claim 2, wherein the base boom section is configured to rotate relative to the chassis about a substantially vertical axis.

4. The service vehicle of claim 3, wherein the base boom section is configured to rotate relative to the chassis about a substantially horizontal axis.

5. The service vehicle of claim 2, wherein the fly boom section is translatable relative to the base boom section between an extended position and a retracted position, and wherein the fly boom section is pivotally coupled to the base boom section such that the fly boom section is rotatable relative to the base boom section about an axis of rotation at least when the fly boom section is in the extended position.

6. The service vehicle of claim 1, wherein the wireless charging interface extends above the cabinet when in the storage position.

7. The service vehicle of claim 1, wherein the tractive elements are configured to propel the service vehicle in a forward direction, and wherein the side of the cabinet is a front side of the cabinet.

\* \* \* \* \*